Oct. 10, 1961 H. D. CRANE 3,004,244

DIGITAL CIRCUIT USING MAGNETIC CORE ELEMENTS

Filed Dec. 23, 1957

INVENTOR.
HEWITT D. CRANE

BY Christie, Parker & Hale
ATTORNEYS 3,004,244
Patented Oct. 10, 1961

3,004,244

DIGITAL CIRCUIT USING MAGNETIC CORE ELEMENTS

Hewitt D. Crane, Palo Alto, Calif., assignor to Burroughs Corporation, Detroit, Mich., a corporation of Michigan
Filed Dec. 23, 1957, Ser. No. 704,511
10 Claims. (Cl. 340—174)

This invention relates to binary information storage and transfer apparatus, and more particularly, is concerned with magnetic core pulse-operated circuits for storing and controlling the transfer of binary information.

In copending application Serial No. 698,633, filed November 25, 1957 in the name of Hewitt D. Crane and assigned to the assignee of the present invention, there is described a core register having a novel transfer circuit requiring no diodes or other impedance elements in the transfer loops between the magnetic core devices in the register. The present invention constitutes an improvement on the register therein described.

In the core register therein described, information is transferred from one core to another by means of pulses of predetermined current level. By the present invention, the range over which this current level of the transfer pulse may vary without materially affecting the information transfer is greatly extended. Not only does the present invention extend the range over which the level of current in the transfer pulses can vary, but it provides increased speed of transfer of information between cores and at the same time increases the number of cores which can be driven in response to a given transfer pulse.

These and other improved results which will hereinafter become apparent are achieved in the present invention by additional biasing windings arranged on the core elements of the register. Bias is provided in either one or both of the core elements which are transmitting and receiving information in a given transfer cycle.

In brief, the present invention is incorporated in a register comprising at least two annular cores of magnetic material having a high flux remanence. Means including windings on the cores is provided for saturating the flux in one direction in each of the cores. Each core has a pair of apertures, the cores being coupled by a transfer loop linking the cores through one of the apertures in each core. The loop consists of a pair of windings, one winding on each core, connected in parallel. Information transfer is effected by applying a current pulse of predetermined magnitude through the two windings of the transfer loop which is just below the threshold current required to switch flux around the annular cores.

According to the present invention, bias windings are wound on one or the other or both of the cores and a bias current is passed through these windings in a direction to normally oppose the switching of flux around the respective cores in response to a transfer pulse. The bias windings may be energized from a separate source, but preferably are energized by the transfer pulse by connecting the bias windings of adjacent cores in series with each other and with the transfer loop.

For a more complete understanding of the invention reference should be had to the accompanying drawings, wherein:

FIGS. 1, 2, and 3 show a ferrite magnetic core element as used in the present invention in various conditions of magnetization;

Figure 1:
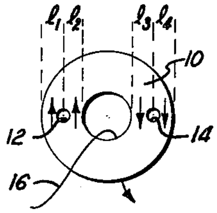
Figure 2:
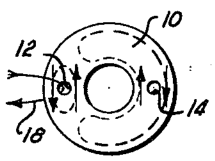
Figure 3:
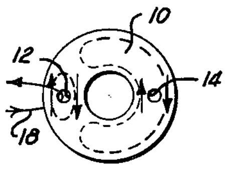

As described in more detail in the above mentioned copending application, a binary register and transfer circuit can be constructed using basic core elements as shown in FIGS. 1, 2 and 3. The core elements comprise an annular core 10 made of magnetic material, such as ferrite, having a "square" hysteresis loop, i.e., a material having a high flux remanence. The annular core 10 is provided with two apertures 12 and 14 which each divide the core into two legs or parallel flux paths, $l_1$, $l_2$, $l_3$, and $l_4$. If a large current is passed through the central opening of the core 10, as by a clearing winding 16, the flux in the core may be saturated in a clockwise direction, as indicated by the arrows in FIG. 1. This flux condition of the core is designated as the binary zero condition. If a current is passed through one of the apertures 12 or 14, as by passing a current through a winding 18 passing through the aperture 12, the flux in the legs $l_1$ and $l_3$ is reversed, as indicated by the arrows in FIG. 2. This flux condition is designated as the binary one condition.

If the current is now passed through the winding 18 in the opposite direction, the flux is switched locally in the legs $l_1$ and $l_2$ around the aperture 12, but no flux is switched in the legs $l_3$ and $l_4$ about the aperture 14, as shown by the arrows in FIG. 3.

Figure 4:
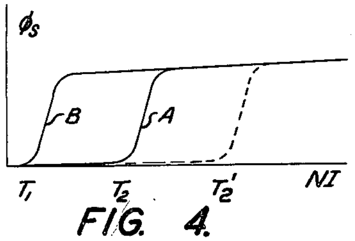
FIG. 4 is a set of curves illustrating the magnetizing properties of the core element of FIGS. 1, 2 and 3 in response to current passing through one of the small apertures in the core element.

If the core 10 is initially in its cleared or binary zero condition, applying a current through the winding 18 linking the aperture 12 of the core 10 switches flux according to the relation set forth by curve A in FIG. 4, which is a plot of switched flux $\Phi_s$ as a function of ampere-turns NI. Thus if the ampere-turns is increased up to threshold level $T_2$, substantially no flux is switched in the core. When the ampere-turns exceeds the threshold level, the flux rapidly begins to switch with further increase of ampere-turns, until a saturation level is reached in which all of the flux is switched in the opposite direction that can be switched. As mentioned above, this results in the flux pattern of FIG. 2 in which the core is in its set or binary one condition.

If the current is passed through the winding 18 in the opposite direction with the core in its binary one condition, the resulting switch in flux as a function of ampere-turns is represented by curve B of FIG. 4. It will be seen that the ampere-turns increases to a lower threshold level $T_1$ which is substantially less than the threshold level $T_2$ of curve A. The flux begins to switch until a saturation level is reached in which all the flux is switched that can be switched. The reason the threshold is at a much lower level in the latter case is that flux is switched only locally about the aperture 12 and not in the much longer flux path around the annular core.

Figure 5:
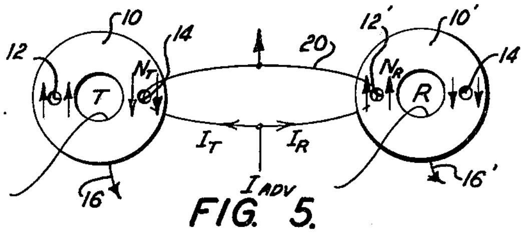
FIGS. 5 and 6 show pairs of core elements linked by a transfer circuit.

As further described in the above-identified copending application, the flux state of one core can be transferred to another core in the following manner. Consider the circuit of FIG. 5 including a transmitter core 10 and a receiver core 10'. A coupling loop 20 links the core 10 through the aperture 14 to the core 10' through the aperture 12'. An advance current $I_{Adv}$ splits between the winding linking the aperture 14 of the transmitting core and the aperture 12' of the receiving core. The level of the advance current and the resistances in the respective windings are arranged so that, with the cores in their cleared condition as shown in FIG. 5, they are both brought up to the threshold level $T_2$, as indicated in FIG. 4. Thus no flux is switched in either core.

Figure 6:
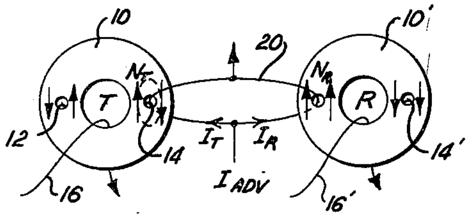

However, if the transmitting core 10 has been previously set with its flux in the binary one condition, as shown in FIG. 6, a current passing through the aperture 14 can switch flux locally in the core 10 because the transfer current exceeds the lower threshold level $T_1$. The switching of flux about the aperture 14 in the transmitting core 10 induces a voltage in the coupling loops which, by Lenz's law, opposes the flow of current in the branch of the coupling loop linking the aperture 14 to the transmitting core. As a result the current passing through the branch of the transfer loop 20 which links the aperture 12' of the receiving core 10' increases. The increased current is sufficient to switch flux in the receiving core 10', thereby setting the flux to the binary one condition.

In this manner the application of a transfer pulse of predetermined magnitude across the transfer loop 20 leaves the receiving core 10' in the binary zero state or changes it to a binary one state, depending on the existing condition of the transmitting core 10.

From the above analysis of the transfer circuit, it will be seen that as far as the transmitter core is concerned it is desirable that the range between the lower threshold $T_1$ and the upper threshold $T_2$ be made as large as possible. The difference between the two thresholds represents an excess magnetomotive force available for switching flux in the receiver core in the transfer of a binary one. Obviously the greater this excess M.M.F., the faster the switching time of flux in the receiving core, and also the greater the range in which the advance current can vary below the upper threshold level and still produce substantial switching of flux in the receiving core.

One evident way of increasing the excess M.M.F. is to increase the flux path lengths around the annular core in relation to the flux path lengths around the small apertures in the core. The present invention provides a way of achieving the same result electrically with a much smaller core than otherwise would be required and with inherent savings in switching energy.

Figure 7:
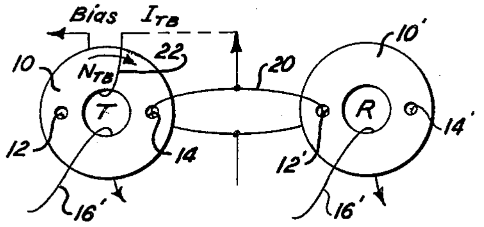
FIG. 7 shows a transfer circuit with bias added to the transmitting core element.

Consider an additional winding on the transmitter core, as indicated at 22 in FIG. 7. A current is passed through the bias winding 22 in a direction which opposes the switching of flux in the core when it is in its cleared condition. The bias current $I_{TB}$ may be derived from a separate D.C. source, or may be derived from the transfer pulse, as by connecting the bias winding 22 in series with the transfer loop 20, in the manner indicated by the dotted line in FIG. 7.

Since the bias current opposes the switching of flux in the core in response to current through the transfer winding, the result is to increase the threshold level at which the transfer pulse can reverse the flux in the transmitter core 10. As a practical matter, the maximum bias that can be tolerated corresponds to the threshold level $T_2$. If the bias were made larger than this it would switch flux in the core when the core was set in the binary one condition. In other words, the bias would act like a clearing winding.

With the bias set at the threshold $T_2$, the ampere-turns in the transfer winding linking the output aperture of the transmitter core can be increased to a threshold level $T_2'$, which is substantially double the threshold level without the bias. As long as the bias is held below the threshold level $T_2$, it has no effect on the transmitter core when it is in its binary one condition. Hence, the lower threshold $T_1$ at which flux switches locally around the output aperture of the transmitter core in response to the advance current applied to the transmitter is unaffected by the addition of bias. In this manner the excess M.M.F. is substantially doubled by the addition of bias on the transmitter, since the advance current can now be operated at a level corresponding to the threshold $T_2'$.

While the transmitter bias may be supplied by a separate D.C. source, it is advantageous and simpler to provide the bias current by connecting the bias winding 22 in series with the transfer loop 20, as indicated by the dotted line in FIG. 7. Since the current passing through the bias winding is now equal to the advance current, the number of turns in the bias winding would have to be at most one fourth the number of turns in the advance winding. The reason is that only substantially half the advance current passes through the transfer winding on the transmitter core, yet the ampere-turns must be at least twice that of the bias winding. Accordingly, the number of turns in the bias winding must be at most a fourth the number of turns in the transfer winding to keep the bias below the threshold $T_2$ as required.

While the addition of bias on the transmitter core permits the advance current to be increased, it is necessary that the advance current not produce any switching of flux in the receiver core when the transmitter core is in the cleared or binary zero condition. Adding transmitter bias and doubling the magnitude of the advance current without otherwise modifying the circuit of course would result in the threshold being exceeded in the receiver core so that flux would be switched in the receiver core by the advance pulse. This may be corrected by reducing the number of turns in the winding linking the aperture 12' of the receiver core 10' or by increasing the resistance in the portion of the transfer loop linking the aperture 12' of the receiver core 10'.

Figure 8:
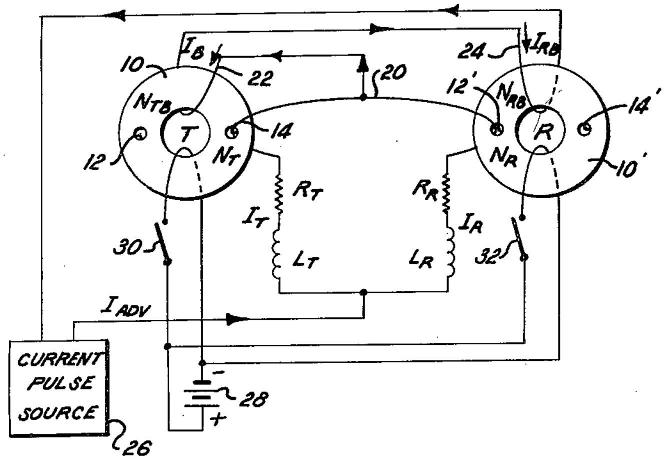
FIG. 8 shows a transfer circuit with a bias winding added to both the transmitter element and the receiver element.

Consider the transfer circuit as shown in FIG. 8 in which the resistance and inductance of the two windings in the transfer loop are schematically shown as lumped resistance $R_T$ and $R_R$ and $L_T$ and $L_R$ respectively. The cores 10 and 10' may be selectively cleared from a D.C. source 28 by switches 30 and 32. The advance current $I_{Adv}$ during transfer, as derived from a suitable pulse source 26, splits between the two branches as the current $I_T$ and $I_R$. On a steady state basis when both cores are cleared, the required ampere-turns in the several windings, as indicated by the above discussions, must bear the following relation:

$$N_T I_T - N_{BT} I_{Adv} = N_R I_R = T_2 \text{ (threshold)} \qquad (1)$$

Once the number of turns in the respective windings is chosen, the ratio of the resistances in the two windings of the transfer loop is fixed according to the relationship of the current as set forth in Equation 1. Thus since $I_{Adv} = I_T + I_R$ and since $I_T R_T = R_R I_R$, the required ratio of the resistances to get the necessary current split to bring each of the cores just to the threshold level may be expressed as follows:

$$\frac{R_R}{R_T} = \frac{I_T}{I_R} = \frac{N_R + N_{BT}}{N_T - N_{BT}} \qquad (2)$$

The difficulty with adjusting the resistors in the two windings of the transfer loop according to the relationship of Equation 2 is that the time constants of the two windings are not equal. Once the number of turns in the respective windings is chosen, the ratio of $$\frac{L_T}{L_R}$$

is fixed by the relation $$\frac{L_T}{L_R} = \frac{N_T^2}{N_R^2}$$

since, by symmetry, the pertinent magnetic paths are substantially identical in the transmitter and receiver when both are in the cleared state. The ratio of the time constant $$\frac{L_T/R_T}{L_R/R_R}$$

then becomes:

$$\frac{L_T/R_T}{L_R/R_R}=\frac{N_T^2}{N_R^2}\left(\frac{N_R+N_{BT}}{N_T-N_{BT}}\right) \quad (3)$$

Since $N_T$ must be substantially equal to or greater than $N_R$ for the transfer of binary ones without loss of flux during the transfer, as discussed in detail in copending application Serial No. 698,615, filed in the name of David Bennion and assigned to the assignee of the present invention, the above expression for the ratio of the time constants will necessarily be greater than unity. Of all the possibilities for the time constant ratio, i.e., greater than or less than or equal to unity, the ratio greater than unity is the least desirable. Under these conditions, with the square pulse of the advance current applied to the transfer loop, there is an initial overshoot of the receiver current $I_R$. Since it is desirable to make $I_R$ as large as possible without causing any flux to switch in the receiver core during the transfer of zeros, the overshoot is normally sufficient to cause some switching of flux when no switching of flux is required.

An overshoot in the transmitter current, however, is not particularly undesirable since the principal concern is to switch no flux in the receiver during the advance pulse if the transmitter is in its cleared condition.

In order to avoid the necessity of adjusting the resistances in the two windings of the transfer loops to get the proper current split, bias may be provided on the receiver core. Such a bias winding is indicated at 24 in FIG. 8. The current $I_{RB}$ is passed through the bias winding of the receiver core in a direction to oppose switching of flux by the advance current in the transfer loop. Bias current may be from a separate D.C. current source but may also be derived from the advance current in the same manner as the bias on the transmitter core. Thus the winding 24 may be connected in series with the bias winding 22 and the transfer loop 20 as shown in FIG. 8.

As a result, a new term is added to the relation of Equation 1 as follows:

$$N_T-N_{BT}I_{Adv}=N_RI_R-N_{BR}I_{Adv}=T_2(\text{threshold}) \quad (4)$$

The resulting expression for the ratio of the time constants therefore is:

$$\frac{L_T/R_T}{L_R/R_R}=\frac{N_T^2}{N_R^2}\left[\frac{N_R-(N_{BR}-N_{BT})}{N_T+(N_{BR}-N_{BT})}\right] \quad (5)$$

It will be apparent from Equataion 5 that by making the turns in the receiver bias winding greater than the number of turns in the transmitter bias windings, the time constant ratio can be made equal to or less than unity. Thus it will be seen that the addition of the receiver bias provides an additional parameter which may be adjusted so that the desired split of current between the two windings of the transfer loop in the steady state condition, as well as the time constants of the two windings of the transfer loop, can be achieved.

Actually, any set of turns for the four windings, i.e., $N_T$, $N_R$, $N_{BT}$, $N_{BR}$, determines a value of transmitter bias and time constant ratio. Therefore, not all sets of turns on the four windings are usable, since any particular set may yield a transmitter bias greater than the allowed threshold value $T_2$, or else may yield undesirable time constant ratios. For example, one suitable set of turns which yields a transmitter bias of about 70% of threshold and a time constant ratio very close to unity is $N_T=12$, $N_R=10$, $N_{BT}=2$, and $N_{BR}=3$.

It should be noted that since the receiver core always starts in the cleared condition, there is no limitation imposed on the maximum value of the receiver bias, such as is imposed on the transmitter bias. The only limitation is that if a D.C. current is used for the receiver bias, the receiver bias can then not exceed the threshold level $T_2$, since otherwise it would restore the receiver core to the cleared condition following a transfer of a binary one from the transmitter core. However, this is no problem if the receiver bias is pulsed simultaneously with the pulsing of the transfer loop.

It should be further noted that while the bias can be derived either from a separate D.C. source or from the advance current pulse, the latter arrangement as illustrated in FIG. 8 is preferred since it has a self-regulating effect with fluctuations in the magnitude of the advance current. It will be appreciated, for example, that if the advance current increased, which normally would have the effect of raising the M.M.F. generated by the windings of the transfer loop above threshold, the same increase in the advance current increases the bias in a manner to oppose the switching of flux due to the increased M.M.F. generated by the transfer loop. Since the M.M.F. generated by the bias windings is generally less than the M.M.F. generated by the windings of the transfer loop, the compatible bias arrangement of FIG. 8 is not completely self-compensating but nevertheless does have a material effect in stabilizing the threshold for changes in the magnitude of advance current.

It should be noted that, while the receiver bias winding is shown as linking the receiver core through the central opening, the receiver bias winding might just as well pass through the input aperture 12' so as to link only the leg $l_1$ if desired. It will be apparent that this change would in no way alter the principle of operation of the receiver bias.

What is claimed is:

1. Apparatus comprising at least two storage elements, each element including an annular core of magnetic material having a substantially rectangular hysteresis loop the core having at least two apertures therethrough which are of substantially smaller size than the central opening formed by the annular shape of the core, a clearing winding linking the core through the central opening thereof for saturating the core in response to a unidirectional current passed through the clearing winding, an input winding linking the core through one of said apertures, and an output winding linking the core through the other of said apertures, the output winding of one core being directly connected across the input winding of the other core whereby the two windings are connected in parallel to form a closed conductive loop, means for applying a transfer pulse across the two windings in parallel, the transfer pulse being of predetermined magnitude to bring the cores when saturated by the clearing winding to substantially the threshold level at which flux starts to reverse in the cores, whereby the pulse does not materially alter the flux condition of the cores when they are both saturated by the respective clearing windings, a bias winding on at least one of the cores and linking the core through the central opening, and means for passing current through the bias winding in a direction to induce magnetic flux in the same direction in the core as the clearing winding.

2. Apparatus comprising at least two storage elements, each element including a magnetic core material having a substantially rectangular hysteresis loop having at least three openings therethrough, the openings separating the core into four separate core legs, the closed flux path linking the first and second of the core legs and the flux path linking the third and fourth of the core legs being substantially shorter than any other flux paths linking the respective legs of the core, an input winding linking the core through a first one of said openings and being wound on a first one of said legs, an output winding linking the core through a second one of said openings and being wound on a fourth one of said legs, a clearing winding linking the core through a third one of said openings and wound on a portion of the core of larger cross-sectional area than any of said legs, means for pulsing a unidirectional current through the third winding of sufficient magnitude to saturate the flux in each of said legs, the output winding of one core being directly connected across the input winding of the other core in parallel, whereby the two windings form a closed loop conductive path, means for applying a transfer pulse across the two windings in parallel, the transfer pulse being of predetermined magnitude to bring the cores when saturated by the clearing windings to the threshold level at which flux starts to reverse in the cores, whereby the pulse does not materially alter the flux condition of the cores when they are both saturated by the respective clearing windings, a bias winding on at least one of the cores and linking the core through said third opening, and means for passing a current through the bias winding in a direction to induce magnetic flux in the same direction in the core as the clearing winding.

3. Apparatus comprising at least two storage elements, each element including a magnetic core material having a substantially rectangular hysteresis loop having at least three openings therethrough, the openings separating the core into four separate core legs, an input winding linking the core through a first one of said openings and being wound on a first one of said legs, an output winding linking the core through a second one of said openings and being wound on a second one of said legs, a clearing winding linking the core through a third one of said openings and wound on a portion of the core of larger cross-sectional area than any of said legs, means for pulsing a unidirectional current through the third winding of sufficient magnitude to saturate the flux in each of said legs, the output winding of one core being directly connected across the input winding of the other core in parallel, whereby the two windings form a closed loop conductive path, means for applying a transfer pulse across the two windings in parallel, the transfer pulse being of predetermined magnitude to bring the cores when saturated to the threshold level at which flux starts to reverse in the cores, whereby the pulse does not materially alter the flux condition of the cores when they are both saturated by the respective clearing windings, a bias winding wound on at least one of the cores, the winding linking the core through said third opening, and means for passing current through the bias winding in a direction to induce magnetic flux in the same direction in the core as the clearing winding.

4. Apparatus for storing and transferring binary information comprising at least two magnetic cores of material having a substantially rectangular hysteresis loop, each of the cores being annular in shape and having at least one input aperture and one output aperture extending through the core material, the apertures being of smaller size than the opening formed by the annular core, an input winding linking the input aperture of the first core, an output winding linking the output aperture of the second core, a bidirectionally conductive transfer loop including a winding linking the output aperture of the first core and a winding linking the input aperture of the second core, the windings being directly connected in parallel to form the loop, means for applying a transfer pulse across the loop between the two windings whereby a current is provided simultaneously through the two windings, the current dividing between the two loops according to the respective impedances of the two windings, and bias windings wound on each of the cores, the bias windings being connected in series with each other and with the transfer loop, whereby the transfer pulse energizes the two bias windings.

5. Apparatus for storing and transferring binary information comprising at least two magnetic cores of material having a substantially rectangular hysteresis loop, each of the cores being annular in shape and having at least one input aperture and one output aperture extending through the core material, the apertures being of smaller size than the opening formed by the annular core, an input winding linking the input aperture of the first core, an output winding linking the output aperture of the second core, a bidirectionally conductive transfer loop including a winding linking the output aperture of the first core and a winding linking the input aperture of the second core, the windings being directly connected in parallel to form a closed loop, means for applying a transfer pulse across the loop between the two windings whereby a current is provided simultaneously through the two windings, bias windings wound on each of the cores, and means for passing a current through the bias windings simultaneously with the applying of the transfer pulse across said loop.

6. Apparatus for storing and transferring binary information comprising at least two annular magnetic cores of material having a substantially rectangular hysteresis loop, each of the cores having at least two apertures extending through the core material, a bidirectionally conductive transfer loop including two windings in parallel, the windings respectively linking one aperture in each of the two cores, means for applying a transfer pulse across the two windings in parallel, the magnitude of the pulse being such as to produce a current in each of the windings that is slightly less than the threshold current level required to switch flux in the associated cores when all the flux is set in one direction around the annular cores, bias windings wound on each of the cores, and means for simultaneously passing current through the respective bias windings in a direction to oppose the switching of flux in the cores by the transfer pulse.

7. Apparatus as defined in claim 6 wherein said means for passing current through the bias windings includes the means for applying a transfer pulse to the transfer loop.

8. Apparatus for storing and transferring binary information comprising at least two annular magnetic cores of material having a substantially rectangular hysteresis loop, each of the cores having at least two apertures extending through the core material, a bidirectionally conductive transfer loop including two windings in parallel, the windings respectively linking one aperture in each of the two cores, means for applying a transfer pulse across the two windings in parallel, the magnitude of the pulse being such as to produce a current in each of the windings that is slightly less than the threshold current level required to switch flux in the associated cores when all the flux is set in one direction around the annular cores, and a bias winding wound on one of the cores and connected in series with the transfer loop.

9. Apparatus for storing and transferring binary information comprising at least two annular magnetic cores of material having a substantially rectangular hysteresis loop, each of the cores having at least two apertures extending through the core material, a bidirectionally conductive transfer loop including two windings in parallel, the windings respectively linking one aperture in each of the two cores, means for applying a transfer pulse across the two windings in parallel, the magnitude of the pulse being such as to produce a current in each of the windings that is slightly less than the threshold current level required to switch flux in the associated cores when all the flux is set in one direction around the annular cores, a bias winding wound on at least one of the cores, and means for passing a current through the bias winding in a direction to induce flux in the opposite direction in the associated core from the direction of flux induced in the core by the transfer pulse, the biasing winding being energized at least during the time the transfer pulse is applied to the transfer loop.

10. A magnetic shift register including first and second core elements of magnetic material having a substantially rectangular hysteresis loop, each core element having a large aperture defining a relatively long flux path and a pair of small apertures defining relatively short flux paths, each of the small apertures dividing the relatively long flux path into two parallel branches, a closed bidirectionally conductive loop including a first winding linking one of said parallel branches of the first core element through one of the small apertures and a second winding linking one of said parallel branches of the second core element through one of the small apertures, a first clearing winding linking the relatively long flux path of the first core element through the large aperture, a second clearing winding linking the relatively long flux path of the second core element through the large aperture, a bias winding linking the relatively long flux path of the first core element, and a shifting control circuit including means for pulsing a transfer current through the two apertures linked by the windings of said loop and simultaneously pulsing a current through the bias winding.

References Cited in the file of this patent

UNITED STATES PATENTS

| | | |
|---|---|---|
| 2,781,503 | Saunders | Feb. 12, 1957 |
| 2,785,390 | Rajchman | Mar. 12, 1957 |
| 2,818,555 | Lo | Dec. 31, 1957 |
| 2,842,755 | Lamy | July 8, 1958 |
| 2,889,542 | Goldner et al. | June 2, 1959 |
| 2,911,628 | Briggs et al. | Nov. 3, 1959 |